US005134704A

United States Patent [19]

Leuty

[11] Patent Number: 5,134,704
[45] Date of Patent: Jul. 28, 1992

[54] FAULT TOLERANT, COLLATERAL MESSAGE AND RECOVERY SYSTEM WITHIN A TELEPHONE DISTRIBUTED PROCESSING SYSTEM HAVING MESSAGE SWITCHING MODULES FOR TRANSMISSION LINK

[75] Inventor: Stephen C. Leuty, Stittsville, Canada

[73] Assignee: Northern Telecom Limited, Montreal, Canada

[21] Appl. No.: 153,947

[22] Filed: Feb. 9, 1988

[30] Foreign Application Priority Data

Oct. 8, 1987 [CA] Canada ................................. 548919

[51] Int. Cl.⁵ ..................... G06F 13/00; H04J 3/00
[52] U.S. Cl. .......................... 395/575; 364/DIG. 1;
364/222.2; 364/238.1; 364/238.2; 364/265.1;
364/265.2; 364/284; 364/919.4; 364/942;
370/53; 371/13; 379/94
[58] Field of Search ... 364/200 MS File, 900 MS File;
371/12, 62, 13; 370/13, 56, 110.2, 53; 379/94,
95, 279

[56] References Cited

U.S. PATENT DOCUMENTS

| | | | |
|---|---|---|---|
| 3,908,099 | 9/1975 | Borbas et al. ..................... | 371/62 X |
| 4,131,945 | 12/1978 | Richardson et al. ............... | 364/200 |
| 4,133,979 | 1/1979 | Helliwell et al. .................. | 370/110.2 |
| 4,213,201 | 7/1980 | Gaghier et al. .................... | 370/13 X |
| 4,288,870 | 9/1981 | McDonald et al. ................. | 370/56 |
| 4,413,335 | 11/1983 | Clements et al. ................... | 370/16 |
| 4,535,453 | 8/1985 | Rhodes et al. ..................... | 370/13 X |
| 4,550,404 | 10/1985 | Chadrow et al. ................... | 370/110.1 |
| 4,639,889 | 1/1987 | Matsumoto et al. ................ | 364/900 |
| 4,817,091 | 3/1989 | Katzman et al. ................... | 371/62 X |
| 4,860,333 | 8/1989 | Bitzinger et al. ................... | 379/10 |
| 4,914,572 | 4/1990 | Bitzinger et al. ................... | 364/200 |

FOREIGN PATENT DOCUMENTS 0125604 11/1984 European Pat. Off. .
0291791 11/1988 European Pat. Off. .
2022364A 12/1979 United Kingdom .

OTHER PUBLICATIONS

Penney et al; "The software architecture for a large telephone switch", IEEE Transactions on communications; vol. COM 30, No. 6, Jun. 1982, pp. 1369-1378.
H. J. Goehertus; "5ESS-PRX architecture", Telecommunications Review; vol. 42, No. 3, Sep. 1984, pp. 111-131.
Bourne; "The DMS-100 distributed control system fault tolerance, digital-style"; Bell-Northern Research, Canada, vol. 7, No. 4 pp. 6-12.
Argoe et al. "System Recovery in the 2B Processor"; The International Switching Symposium; Paris May 7-11, 1979, pp. 141-148.
Brakel; "Designing a telephone system for quality"; Philips Telecommunication Review, vol. 40, No. 1, Apr. 1982, pp. 25-33.
Holden; "Common Control Design Using Matched Microprocessors for Failure Detection"; GTE Automatic Electric Journal; Sep.-Oct. 1982; pp. 118-121.
Willett; "Design of Recovery Strategies for a Fault-Tolerant No. 4 Electronic Switching System"; The Bell Technical Journal, vol. 61, No. 10, Dec. 1982, pp. 3019-3041.
telesis, 1983 three, DMS-100, BNR.
L. Wozich and A. Jajszczyk, "A Distributed Architecture Line Concentrator", WZT Telkom-Teletra, Poznan, Poland and Technical University of Poznan, Poznan, Poland.

Primary Examiner—Thomas C. Lee
Assistant Examiner—Krisna Lim
Attorney, Agent, or Firm—Nixon & Vanderhye

[57] ABSTRACT

System for collateral out-of-band messaging within the distributed data processing environment in a digital switch which has mainstream in-band data channels. The system comprises independent reset modules, which decode and recognize the out-of-band messages to effect emergency control functions of the distributed processors, such as resetting and jamming an malfunctioning processor.

13 Claims, 4 Drawing Sheets the
FAULT TOLERANT, COLLATERAL MESSAGE AND RECOVERY SYSTEM WITHIN A TELEPHONE DISTRIBUTED PROCESSING SYSTEM HAVING MESSAGE SWITCHING MODULES FOR TRANSMISSION LINK

BACKGROUND OF THE INVENTION

1. Field of the Invention

The present invention relates to digital switching systems, such as voice and data switches, in general, and in particular to those systems employing plural processors for control in a distributed switching environment. More particularly still, it relates to a quasi-independent system and method within the digital switch for surveillance, messaging and limited control of the distributed plural system units.

2. General Prior Art of the Invention

The general prior art digital time division switching system exhibits a hierarchical, two-plane organization comprising duplicate central controllers (CC) at the top, followed by central message controllers (CMC) then by the network modules (NM) proper as well as input-output controllers (IOC). This general architecture is also that within which the system and method of the present invention operate. Such prior art system is disclosed in U.S. Pat. No. 4,213,201 granted Jul. 15, 1980 to Gagnier et al, which is incorporated herein by reference.

A useful general overview of this category of switching systems is given in an article by Robert Wood entitled "DMS-100 technology evolution", at page 6 in Telesis, Volume 10, Number 3, 1983.

SUMMARY OF THE INVENTION

In the above-referenced United States patent to Gagnier et al, the system units are rigidly controlled by the central controller (CC). For example, the central message controller (CMC, FIG. 14) has a limited number of well defined states without independent processing capability. In the course of technological evolution, however, a digital switching system now exhibits distributed processing, and a message switch (MS) has its own processor and its own firmware and software. The same is true of the switching network modules (NM).

Distributed processing in switching systems therefore means a larger number of processors which, if the high level of reliability is to be maintained, means that each single processor must be capable of being disabled and/or reset with a very high degree of reliability in the event it ceases to be operationally sane.

The present invention provides collateral control messaging that is independent of the main messaging system and which operates outside of processor controlled system modules of the same level in the switch hierarchy. Of course, each level remains dependent on the integrity of the level above it, and the whole depends on the sanity of the computing module (CM) at the head of the hierarchy. (The number of levels that may be controlled can be expanded, within a level and in the number of levels). Since every single level has two planes or duplicate modules, and the system is operational with only one plane, operational reliability is in fact very high.

According to the present invention, there is provided a collateral messaging system operating within a distributed data processing system having a plurality of component modules each of which includes a controlling data processor and each of which communicates with other component modules through data links, comprising: (a) arrangement means for transmitting through one of said data links a repeated encoded message; (b) arrangement for extracting from said one of said data links said repeated encoded message; and (c) message decoding arrangements for recognizing and decoding said repeated coded message and directly controlling a predetermined controlling data processor in accordance with said repeated encoded message.

According to the method aspect of the present invention a method of robust collateral messaging within a distributed data processing system having data transmission links between its component modules, comprises the steps of: (a) repeatedly transmitting an encoded messsage through one of said data links; (b) extracting said repeated encoded message; (c) subjecting said repeated encoded message to a predetermined software filtering routine then recognizing or rejecting it; and (d) controlling a predetermined data processor in said distributed data processing system in accordance with a recognized repeated encoded message.

BRIEF DESCRIPTION OF THE DRAWINGS

The preferred embodiment of the present invention will now be described in detail in conjunction with the annexed drawings, in which.

DETAILED DESCRIPTION OF THE PREFERRED EMBODIMENT

Figure 1:
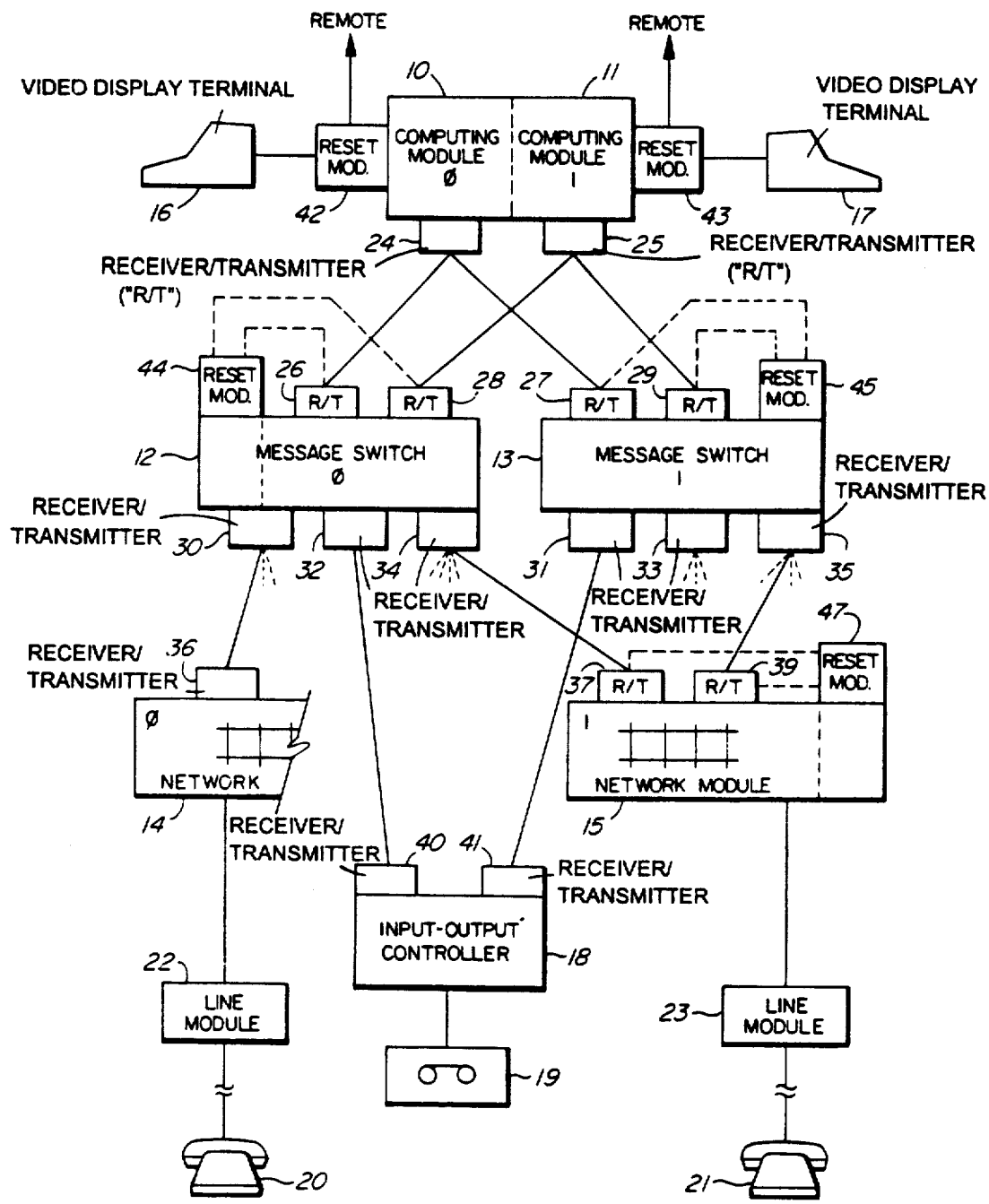
FIG. 1 is a block diagram of the digital switch embodying the system and method of the present invention.

With reference to FIG. 1 of the drawings, the digital switching system shown comprises three duplicated (planes 0 and 1) hierarchical components: computing module (CM) 10 and 11; message switches (MS) 12 and 13; and network modules (NM) 14 and 15; (as mentioned earlier, more depth and width are possible). The computing modules 10 and 11 are identical 32-bit processor based control modules, which operate synchronously and continuously, even though only one of the two CMs 10 and 11 has control of the switch at any given moment. Control of the switch shifts without interruption from one of the CMs 10 and 11 to the other, either at the instance of a human operator via one of video terminals (VDT) 16 and 17, or automatically by software, or should the CM in control loses sanity.

While only one of the CMs 10 and 11 is in control at any time, the message switches (MS) 12 and 13 are both operating simultaneously, and serve primarily as a conduit for 8-bit in-band (IB) messaging from the controlling CM 10 or 11 to the network modules (NM) 14 and 15, both of which also operate simultaneously. The MSs 12 and 13 also relay in-band control messages to peripheral in-output controller (IOC) 18, which is shown controlling back-up data storage device 19, which in turn may contain the switching system image data necessary to reboot the system should catastrophic collapse have occurred.

The NMs 14 and 15 interface with the end users of the switching system, shown here as two subscriber station sets 20 and 21, through line modules, (LM) 22 and 23.

The CMs 10 and 11, the MSs 12 and 13, the NMs 14 and 15, as well as the IOC 18 communicate by means of receiver/transmitter modules (R/TM) 24 to 41. For example, R/TM 24 is interconnected with R/TM 26 in MS 12 and with R/TM 27 in MS 13. In the preferred embodiment, an R/TM is an optical receiver/transmitter and the interconnection between R/TMs is via optical fiber links of up to 1 km in length, which carry serially multiplexed data at the rate of 49.152 MHz.

The remaining module in FIG. 1, namely the reset module (RM), is the key component in the collateral messaging and recovery system of the present invention. Each of RMs 42 to 47 is at its controlling output in direct control of the central processing unit (CPU) of the associated CM, MS or NM, each of which has a CPU pursuant to the distributed processing architecture. It is outside the scope of the present invention to consider the internal details of the computing module, the message switch or the network module, except to know that each has a CPU which can be reset and disabled by means of a hard-wired lead from the associated reset module (RM).

Figure 2:
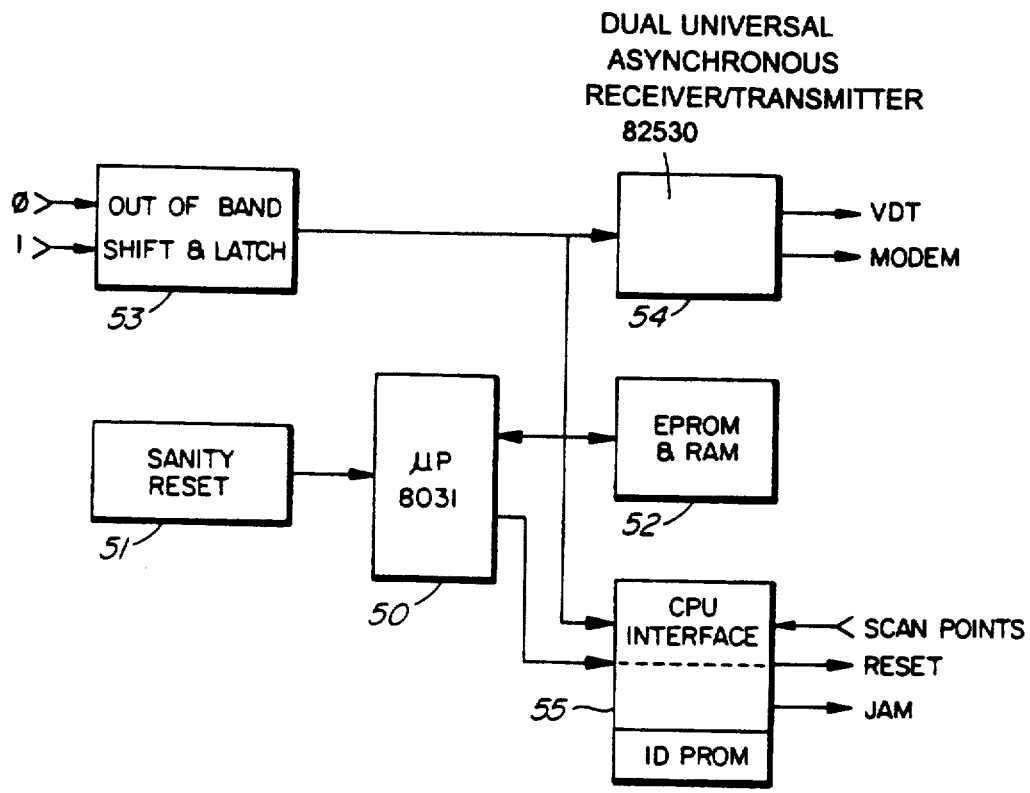
FIG. 2 is a block schematic of the reset module of the present invention shown in FIG. 1.
Figure 3:
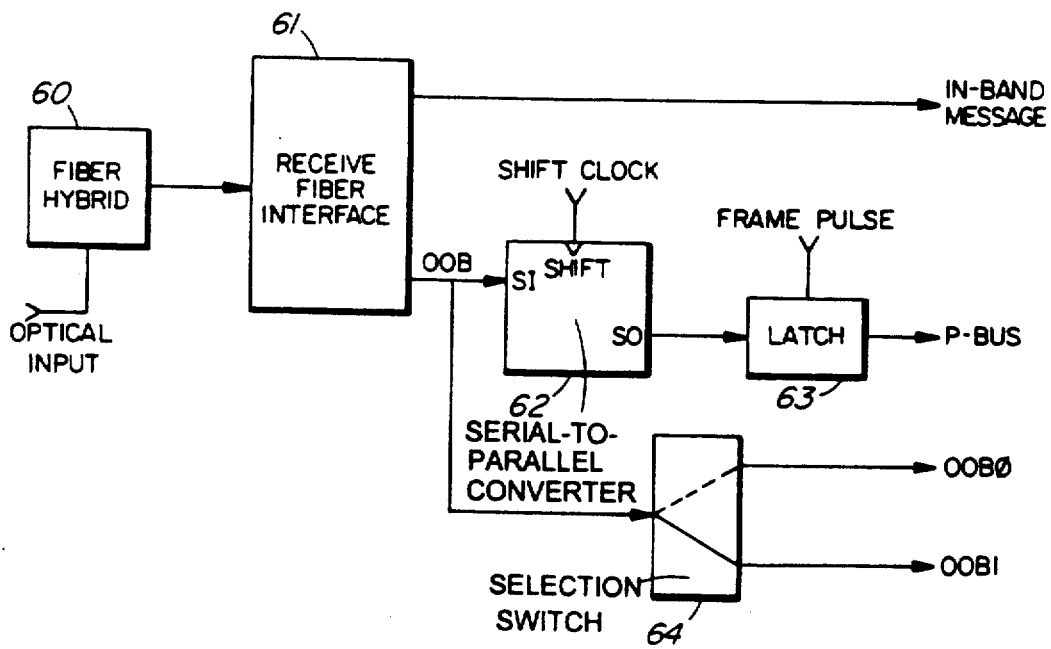
FIG. 3 is a block schematic of the receiver portion of the block labelled R/T in FIG. 1.
Figure 4:
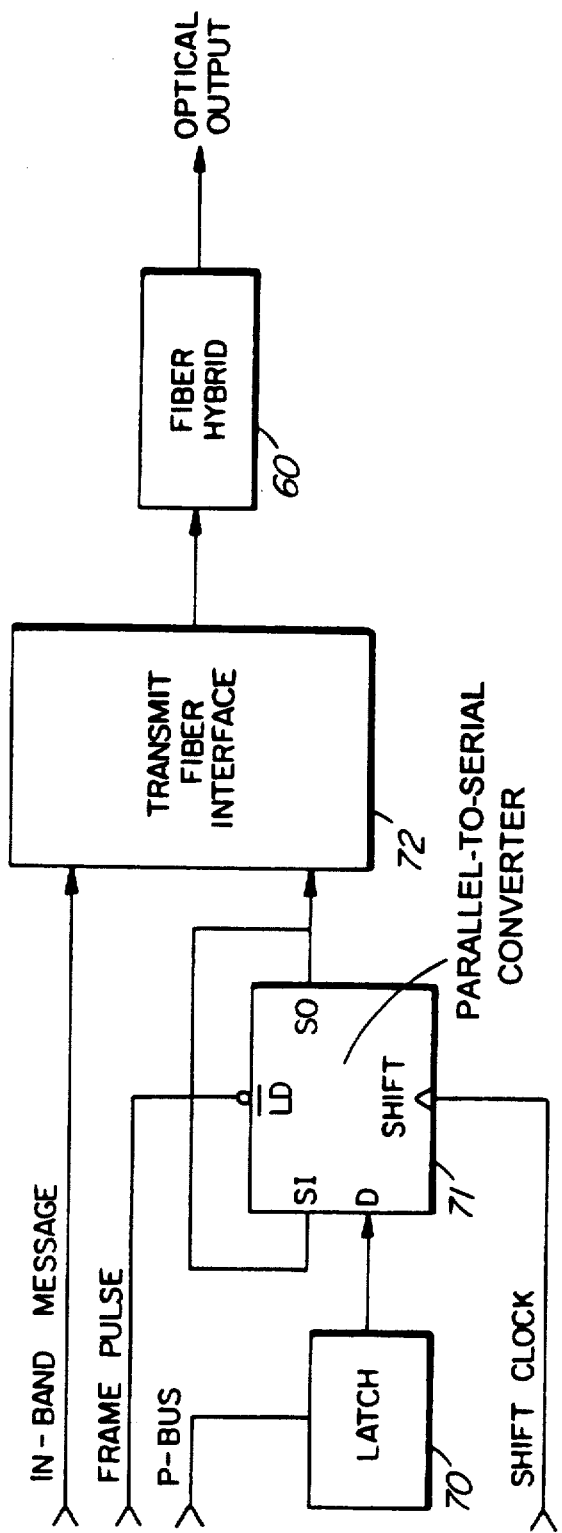
FIG. 4 is a block schematic of the transmitter portion of the block labelled R/T in FIG. 1.

The reset module (RM) is shown in block detail in FIG. 2. It comprises a microprocessor 50 (for example, INTEL's 8031), which is reset every 24 seconds by a sanity reset clock 51 for reliability, unless the clock is inhibited under certain conditions. EPROM and RAM memories 52 store firmware and data. An out-of-band (OOB) data shift and latch interface 53 receives demultiplexed messaging data bits from the respective receiver of R/TMs of the 0 and 1 planes. These messaging data bits convey the commands in the collateral messaging and recovery system and are termed out-of-band (OOB) data because they are not part of the in-band (IB) 8-bit data words that pass between the CM and the NM through the message switches 12 and 13. The data bits travel between R/TMs in 10 bit words. Eight of these bits (In-Band) are under control of the main distributed processors. The two remaining bits may not be altered in their route to the destination RM. One of these is the OOB bit (link) and the other is a spare. The OOB data is multiplexed and demultiplexed into the data stream between system modules at the R/T modules (as shown in FIGS. 3 and 4). This is necessary in order to maintain reliability of communication of commands within the collateral messaging system. The R/T modules are strictly hardware modules, which are duplicated and multiplex/demultiplex identical data streams throughout the switching system. A dual UART (universal asynchronous receiver/transmitter) 54 (for example, INTEL's 82530) serves as interface with the video terminal and a remote link modem if the RM is attached to a CM, such as in the case of RMs 42 and 43. Finally, a CPU interface 55 interfaces the processor 50 to the CPU of the associated CM, MS or NM, as the case may be. The interface 55 also has an ID PROM which stores a label identifying the RM. There is also information available indicating whether it is attached to a CM, MS or NM, and whether in plane 0 or 1. The processor 50 performs, besides its general control functions, a software filtering function on the OOB data to ensure its legitimacy. This will be described later in conjunction with FIG. 5, when describing the operation of the collateral messaging system.

Turning now to FIG. 3, the receiver portion of the R/T module is shown. The optical fiber enters fiber hybrid 60 where the received optical signal is output to a receive fiber interface 61, the outputs of which are the in-band message bits and the OOB serial data. The latter is converted to parallel data in serial/parallel converter 62 and latched onto the processor-bus (P-BUS) in the computing module 10 or 11, but is used for maintenance only. The serial OOB data is supplied to either the 0 or 1 inputs of the RM, shown in FIG. 2, via selection switch 64, depending on which plane the R/T module is connected to. Thus, each RM receives two inputs (identical under normal operation) of OOB data, one from the 0-plane and one from the 1-plane.

FIG. 4 shows the transmitter portion of the R/T module. The OOB data is supplied by the processor of the CM or MS onto the processor-bus and is latched in latch 70 into parallel/serial converter 71 then to transmit fiber interface 72 and onto the fiber via the hybrid 60. It should be understood that OOB data is generated by the processor of the CM (10 or 11) for transmission to the next level in the hierarchy, i.e. to the MSs 12 and 13, which are in turn responsible for transmission to the level below, i.e. the NMs 14 and 15. The MS will output OOB messages only on instructions from the CM. This makes the OOB data transmission dependent on the sanity of the controlling processor, be it in the CM or MS. There is, however, no detriment to reliability of the collateral messaging system, because if both CMs 10 and 11 were to be inoperative, the whole switching system would be inoperative anyway. The same is true if both MSs 12 and 13 were to become inoperative. The fate of received OOB data, however, is different; a reset module, for example RM 45, would still be able to disable or reset its associated MS 13 if it receives a valid OOB command from either of the CMs 10 and 11 via one of the R/T modules 37 and 39. The processor in the CM 10 or 11 on the other hand cannot be disabled or reset by OOB commands, and only an operator can do so via the VDT terminals 16 or 17. In fact, under normal operation, the RMs 42 and 43 attached to the CM are transparent to data emanating from the VDT terminals 16 or 17. These and associated details will be better understood in the context of the following description of the method of collateral messaging of the present system.

As long as the switching system is operating properly, the messaging and recovery system of the present invention operates in a strictly transparent monitoring mode. If, for any reason, the switching system crashes, an operator must first bring up the master CM (either 10 or 11) by means of the respective VDT and associated reset module (16/42 or 17/43). Thereafter the master CM is used to reset and reboot the message switches 12 and 13, and if necessary the network modules 14 and 15 are also reset by MSs 12 and 13. As mentioned above, the recovery messaging proceeds by the collateral out-of-band links which cannot be perturbed by the crash of any of the distributed processors so that the reset commands would not pass through to the insane processor.

In the preferred configuration as shown in FIG. 1 only the reset modules 42 and 43, attached to the computing modules 10 and 11, respectively, have VDT terminals 16 and 17. The reset module is transparent and passes characters back and forth between the VDT and the CM until a designated command character is entered (normally " \ ") which then causes the reset module to go into command collection mode. Characters are then collected in a 16-bit buffer; for example, in order to reset the CM, the following command is entered:

\BOOT<cr>.

where <cr> is the enter key. The firmware of the reset module will request YES/NO confirmation, and when confirmed YES a reset pulse will be output through the CPU interface 55 and the reset module will display BOOT INITIATED on the VDT.

The following are operational codes and parameters of example commands supported by the system:

| OPCODE | PARAM. | EFFECT |
|---|---|---|
| BOOT | COLD (Def.) | Causes cold reset, loading from mass storage and start-up of dead system. |
| BOOT | WARM | Causes reset of active system without reloading. |
| JAM | | Forces active CM CPU inactive. |
| RELEASE JAM | | Releases forced jam, thus allowing activity. |
| RESTART | | Gives CM CPU non-maskable interrupt which causes warm software restart (without loading). |

Any of the commands that may be entered on the VDT may also be entered by the processor in the CM. It is possible in this way for the CM to initiate its own reset (for example, after unsuccessful attempts at reloading) and the following exchange will take place between the CM and the RM.

| | | |
|---|---|---|
| CM to RM: | BOOT COLD | This machine-to-machine exchange actually takes place in hexadecimal code. |
| RM to CM: | PLEASE CONFIRM | |
| CM to RM: | YES | |
| RM to CM: | BOOT INITIATED | |

During the last sequence of the exchange the reset pulse has been applied by the CPU interface 55 to the processor in the computing module. Thus, the CPU has caused itself to be reset.

Figure 5:
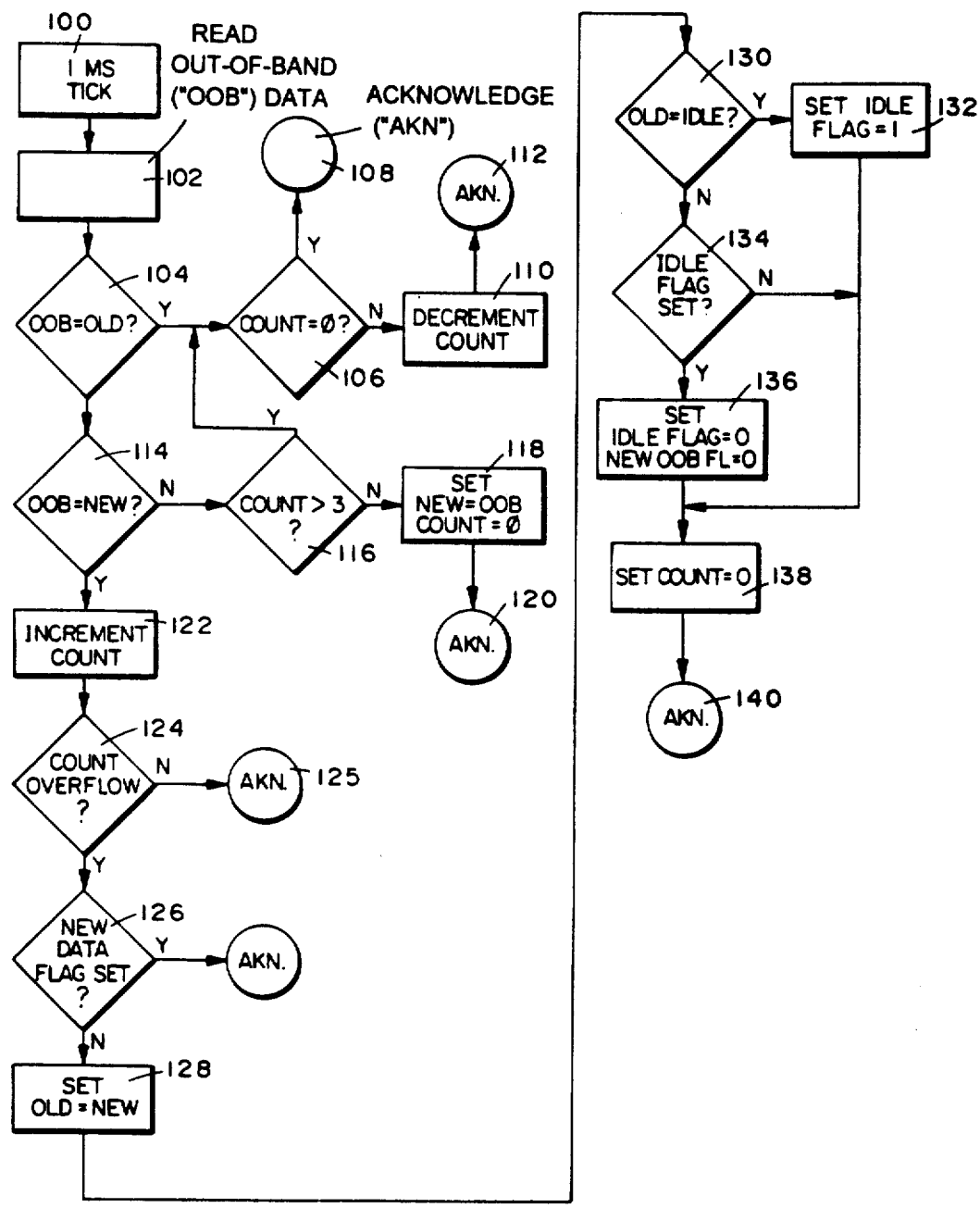
FIG. 5 is a flow-chart for the out-of-band data filtering function performed by the processor in the reset module in FIG. 2.

The OOB data links from the CM and the MS into the lower level reset modules are unidirectional. There are two OOB links terminating on each reset module, one from each plane of the CM or the MS. The command codes used to force control over a subsystem component are sent over the OOB links and are detected and acted upon by the reset module. In principle, any of the commands which may be entered from the VDT may be sent by the OOB links. A command consists of three bytes; a synchronization character, an operation code, and a parameter code. Each byte is proceeded by an idle code. Where YES/NO confirmation of a command is required, it must follow. Since each byte is sent for 200 ms, the worst case time for a command with confirmation is 2.4 seconds. The multiplex optical transmission links between the RT modules carry 512 in-band channels during 125 us frames. An OOB byte is transmitted 4 times within a single frame and persists for at least 200 ms. The reset module samples the OOB data supplied to it by the RT module once every 1 ms (FIG. 5, blocks 100, 102). The OOB data received by the reset module is filtered before accumulation by the firmware routine shown in FIG. 5 in flow-chart form. As a result, the threshold for the processor 50 to begin paying attention to the incoming OOB bytes is that the last 3 bytes received must be the same (FIG. 5, blocks 104-120); after 16 identical bytes the software recognizes the byte as legitimate and stores it (FIG. 5, blocks 122-125). The received sequence of a legitimate command must be as follows:

| 7F | SYNC. | 7F | OPCODE | 7F | PARAM. |
|---|---|---|---|---|---|

Where 7F is the hexadecimal figure representing the idle code.

I claim:

1. A method of robust collateral messaging within a distributed data processing system having data transmission links between component modules thereof, comprising the steps of:
    (a) transmitting at least one encoded message from one of said component modules to another of said component modules through one of said data transmission links;
    (b) extracting said encoded message in said another of said component modules;
    (c) subjecting said encoded message, in said another of said component modules, to a predetermined software filtering routing then recognizing or rejecting said message; and
    (d) controlling a predetermined data processor in said distributed data processing system in response to at least one encoded message recognized by the step (c);
    wherein:
        an encoded message is transmitted several times successively and said predetermined software filtering routine includes comparing predetermined number of extracted consecutive encoded messages, then, if the extracted consecutive encoded messages are identical, continuing comparison up to a larger predetermined number thereof, and storing the latest compared encoded message as legitimate if said latest message is identical to the previously extracted larger predetermined number of encoded messages.

2. The method of robust collateral messaging as defined in claim 1, wherein said step (a) further comprises independently transmitting said encoded message through another of said data transmission links.

3. The method of robust collateral messaging as defined in claim 2, wherein said step (b) further comprises comparing said encoded messasge extracted from said one of said data links with that extracted from said another of said data links.

4. A method as in claim 1 wherein said controlling step (d) includes the step of selectively disabling said predetermined data processor in response to said at least one encoded message.

5. A method as in claim 1 wherein said extracting and subjecting steps each operate on encoded messages carried by redundant data links.

6. A collateral messaging system operating within a distributed data processing system having a plurality of component modules each of which including a controlling data processor and each of which communicating with other component modules through data links, said collateral messaging system comprising:

(a) means in one of said plurality of component modules for transmitting through one of said data links an encoded message;

(b) means in another one of said plurality of component modules for extracting from said one of said data links said encoded message; and (c) message decoding means in said another one of said plurality of component modules for recognizing and decoding said encoded message and for directly controlling an associated controlling data processor in response to said encoded message, wherein the means for extracting said encoded message comprises means for receiving, storing and forwarding to said message decoding means component bits of said encoded message transmitted in a predetermined and independent bit-position on at least two independent ones of said data links;

wherein the message decoding means comprises a stored label for identifying the location of the message decoding means within said distributed data processing system; and wherein the message decoding means further comprises a programmable local data processor for applying a software filtering operation to the component bits of said encoded message.

7. The system as defined in claim 6, said programmable local data processor directly controlling a controlling data processor after said software filtering operation by resetting or disabling the associated predetermined data processor in accordance with the encoded message.

8. The system as defined in claim 7, wherein the message decoding means further comprises sanity reset means for continuously periodically resetting said programmable local data processor.

9. The system as defined in claims 6, 7, or 8, wherein said system includes an input/output terminal, and the means for extracting said encoded message further comprises an asynchronous receiver-transmitter for relaying said encoded message to said input/output terminal of said distributed data processing system.

10. The system as defined in claims 6, 7 or 8, wherein said distributed data processing system further comprises:

a plurality of telephone switching modules;
an intermediary message switching module; and
a master computing module controlling said plurality of telephone switch network modules via said intermediary message switching module.

11. In a telephone switch distributed data processing system including a plurality of telephone switch modules each of which includes a controlling data processor communicating with other telephone switch modules through a data communications network, wherein said controlling data processor is capable of resetting, inhibiting processing and restarting processing, a robust collateral messaging system including:

transmitting means, operatively connected to a first of said plurality of telephone switch modules and to said data communications network, for transmitting an encoded control message over said data communications network;

receiving means, operatively connected to a second of said plurality of telephone switch modules and to said data communications network, for receiving said transmitted encoded control message;

message decoding means, operatively connected to said receiving means, for recognizing and decoding said received encoded control message; and resetting means, coupled to said second module controlling data processor and to said message decoding means, for selectively initiating any of a reset, inhibit processing and restart processing of said second module controlling data processor in response to receipt and successful decoding of said encoded control message by said message decoding means.

12. A system as in claim 11 wherein said resetting means comprises means for initiating any of said reset, inhibit processing and restart processing only upon receipt of redundant versions of the control message by said receiving means.

13. A system as in claim 11 wherein:

said data communications network includes first and second independent data links coupling said transmitting means to said receiving means;

said transmitting means transmits redundant versions of said encoded control message to said receiving means over both said first and said second data links; and said receiving means receives said transmitted redundant versions from both said first and second data links.

* * * * *